April 7, 1959  A. E. EDSTROM  2,880,734
CENTRIFUGAL GRAIN THRESHER AND SEPARATOR
Filed April 12, 1957  3 Sheets-Sheet 1

INVENTOR.
ARTHUR E. EDSTROM
BY

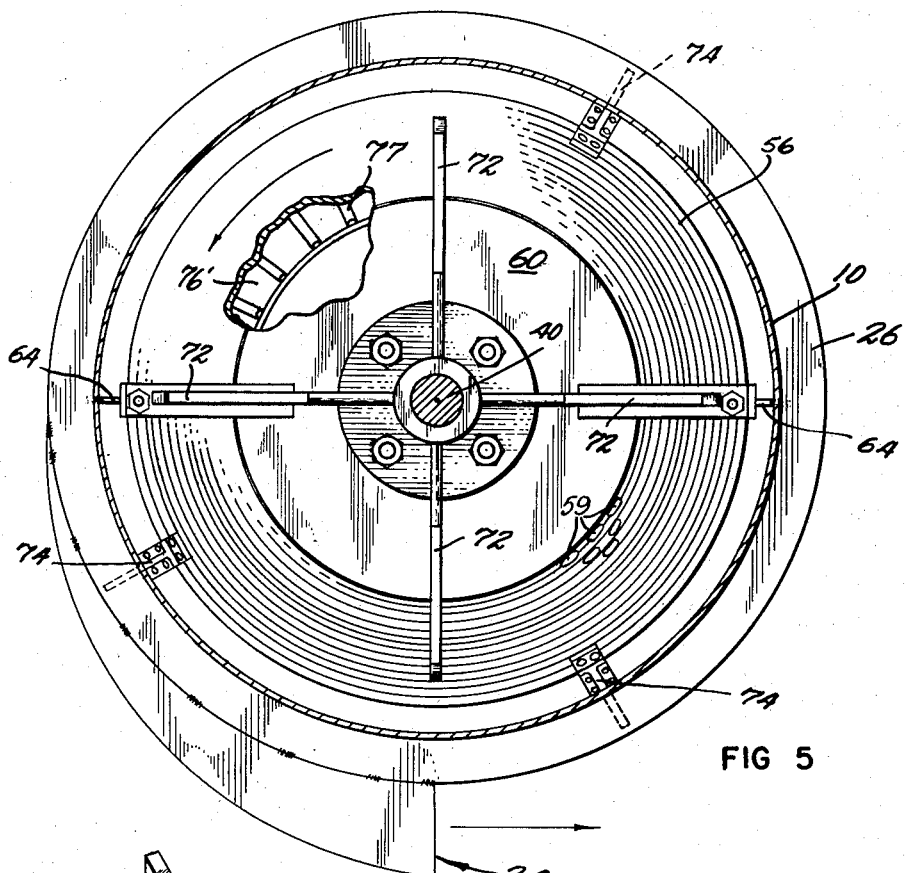
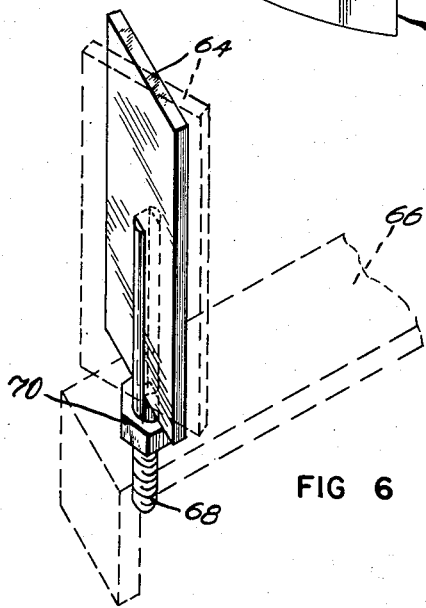
FIG 5
FIG 6
INVENTOR.
ARTHUR E. EDSTROM

United States Patent Office 2,880,734
Patented Apr. 7, 1959

2,880,734

CENTRIFUGAL GRAIN THRESHER AND SEPARATOR

Arthur E. Edstrom, Endicott, Wash., assignor of fifty percent to Carl R. Litzenberger, Endicott, Wash.

Application April 12, 1957, Serial No. 652,436

4 Claims. (Cl. 130—27)

The present invention is a grain separator which employs centrifugal force to effect separation of the heavier grain from the straw and chaff.

One object of the invention lies in the provision of a grain separator which employs the principles of centrifugal force for grain separation and therefore is not adversely affected by tilting movements of the separator.

Another object of the invention lies in the provision of a grain separator having relatively adjustable parts which may be selectively positioned with a minimum expenditure of time and effort so that the grain separator may be quickly and easily adapted to facilitate separation of the grain from the heads and stalks under widely varying conditions and types of grain.

Combined harvester-threshing machines are nearly exclusively used in harvesting operations at this present time. Due to the fact that much of the grain is grown upon farm lands having rolling hills or uneven surfaces, it is necessary that the threshing apparatus of the combine be designed to adequately thresh the grain from the heads while it is being continuously moved from one angular position to another. To facilitate this separation, many adaptations have been applied to the conventional threshing devices which include a rubbing drum and sieves through which air is blown. Since when the combine is traversing a sidehill, the grain and chaff tends to pile up at one side of the separating sieves, devices such as laterally extending conveyors have been applied to move the grain and chaff to the high side of the sieve. Also laterally directed jets of air have been used for the same purpose. These have been found to be successful to some degree, but are not entirely satisfactory since the movement of the grain for separation is always affected by lateral tilting of the combine.

The present invention seeks to overcome these undesirable effects and provides a separator which is not dependent upon gravity, and therefore is not affected by reason of its being tilted from one plane to another, and thus it is a machine which continuously operates at maximum efficiency.

In the accompanying drawings wherein like numerals are employed to designate like parts:

Figure 5 is a horizontal cross section on the plane indicated at 5—5 of Figure 4 looking in the direction of the arrows;

Figure 6 is a fragmentary perspective view of one adjustable blade; and

Figure 1:
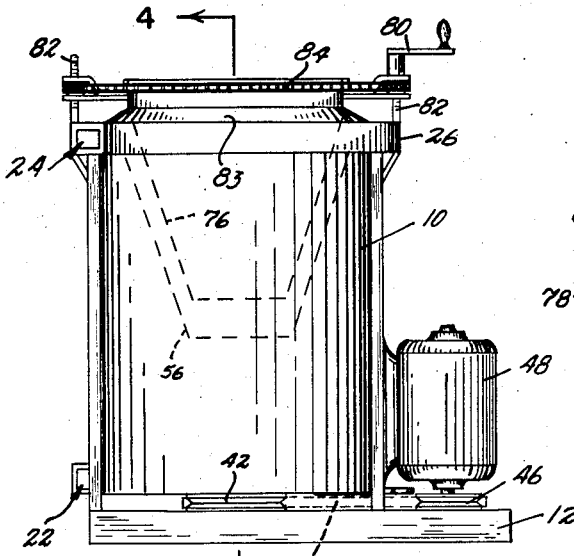
Figure 1 is a side elevation of my improved grain separator.
Figure 2:
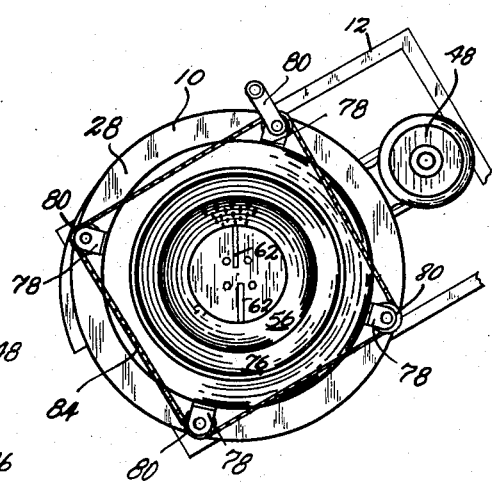
Figure 2 is a top plan view of the same with a portion broken away for convenience of illustration.
Figure 3:
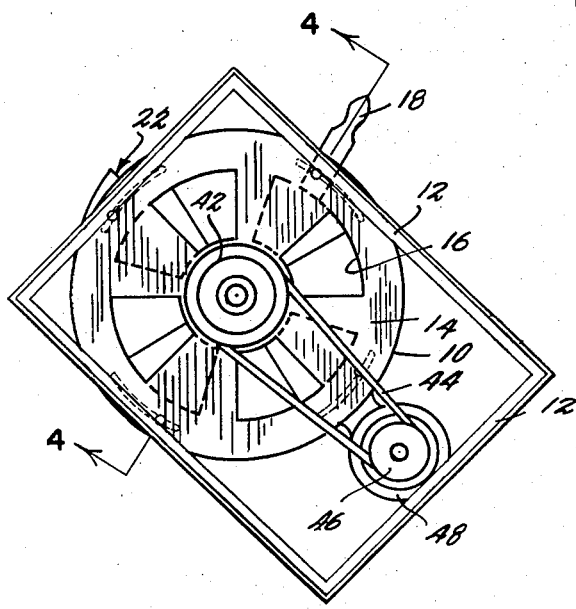
Figure 3 is a bottom plan view of the grain separator.
Figure 7:
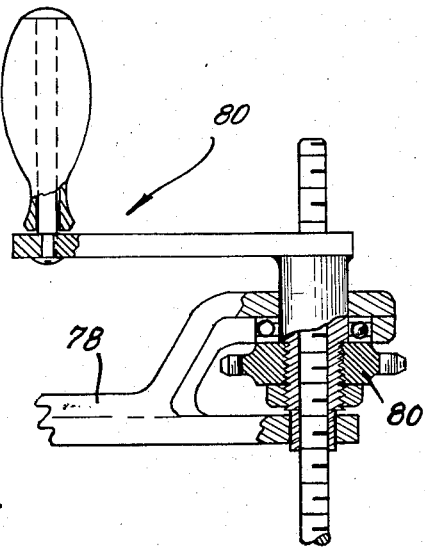
Figure 7 is an enlarged view partially in elevation and partially in cross section showing a means for adjusting relatively movable portions of the separator.

Referring now more particularly to the drawing, I have shown a cylindrical housing 10 which is supported upon a rectangular frame 12 in upwardly spaced relation to a supporting surface so that there is area for passage of air into the housing from the bottom thereof. At the bottom, the housing is provided with an apertured wall 14 to which is movably secured a rotatable closure 16 having a radially extending handle 18. It will thus be seen that as the handle 18 is circumferentially moved, the size of the apertures 16 in the wall 14 may be selectively varied to control ingress of air.

Figure 4:
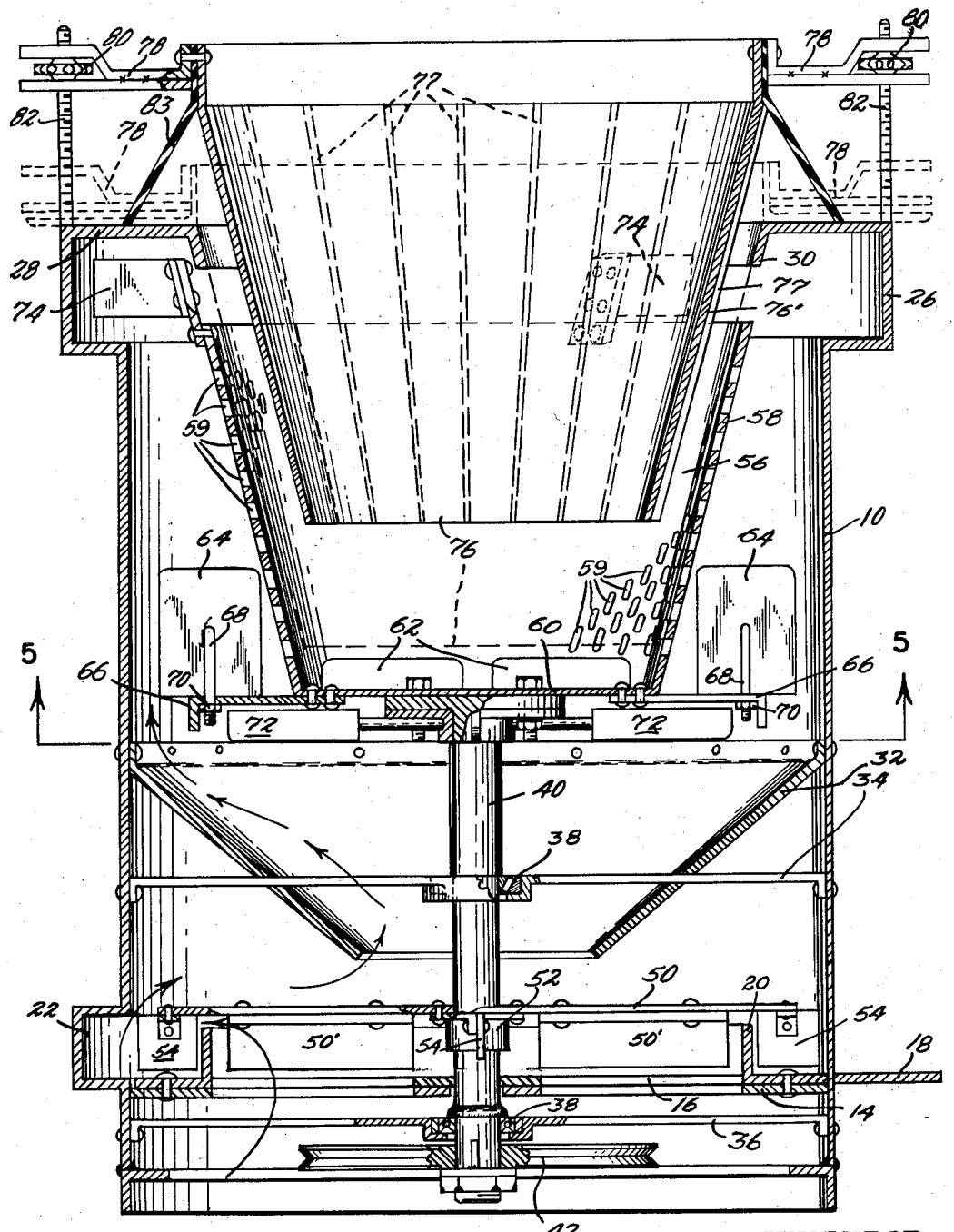
Figure 4 is a vertical diametric cross section taken upon an enlarged scale and on the plane indicated at lines 4—4 of Figures 1 and 3.

Inspection of Figure 4 will reveal that the closure 16 is provided with an upstanding annular wall 20 disposed at a radius coincident to the greatest radius of the apertures 16, and spaced from the wall of the housing.

As seen in Figure 1, the housing is provided with radial discharge apertures 22 and 24 spaced from the lower and upper ends thereof. At the upper end the housing is provided with an enlargement 26 which communicates with the discharge aperture 24 and upwardly terminates in an inwardly turned annular flange 28 forming a horizontal top end wall. A depending annular lip 30 defines a central aperture in the top wall 28 as seen particularly in Figure 4.

Intermediate its length, the housing is provided with a downwardly converging truncated-cone 32 which constitutes a grain pan for guiding grain which is separated by the threshing device, as will be more particularly seen hereinafter. The housing is also provided with spiders or radially disposed arms 34 and 36 which support, at the axis of the housing, radial and thrust bearings 38—38.

A vertically disposed drive shaft 40 is supported in these bearings and is provided with a power transmission element such as pulley 42 at its lower end which is disposed below the lower end of the housing 10 and is driven by means of a belt 44 which is trained about a pulley 46 of the prime mover or electric motor 48.

Relative to the discharge aperture 22, the power shaft 40 is provided with a disc 50 which is secured thereto as by collar 52. At its periphery the disc is provided with vertical depending blades 54 disposed on a horizontal plane coincident to the discharge aperture 22 and the upstanding flange 20. As the shaft 40 is rotated, the blades 54 are rotated and constitute with the housing 10 a centrifugal fan which discharges through the aperture 22. The elements 50 through 54 comprise an impeller of the fan.

At its upper end, the powered shaft 40 supports a truncated-cone-shape drum 56 having a circumferentially continuous upwardly diverging reticulate wall 58 having plural grain passages therethrough as seen at 59 closed at its lower end by an impervious plate forming a bottom wall 60. On the upper face of the bottom wall 60 are a plurality of radially disposed flanges 62, the purpose of which is to agitate the harvested grain and straw for separation. At its lower edge, the drum is also provided with vertical blades 64 which are adjustably anchored to radially extending arms 66 by means of depending externally threaded rods 68 and companion clamping nuts 70. Other blades 72 are also secured to rotate with the drum 56 to create a helical movement of air within the housing 10 and externally of the reticulate drum 56.

At its upper edge the drum is provided with a number of radially disposed blades 74 which extend into the enlargement 26, and constitute impellers of a centrifugal fan. It will be understood that the discharge aperture 24 is larger than the discharge aperture 22, and therefore the amount of air discharged from the device is greater through the aperture 24.

An open-ended truncated cone-shape hopper 26 is supported coaxially with respect to the drum 56 and has upwardly divergent circumferentially continuous walls disposed at a diverging angle from the axis equal to the drum 56. Radially extending arms 78 support the hopper 76 by receiving rotatable sprockets 80 in their bifurcated outer ends. The sprockets are threadedly engaged upon vertically disposed externally threaded rods 82. It will thus be seen that as the sprockets 80 are rotated, the hopper 76 may be raised to the full line position of Figure 4 or lowered to the broken line position thereof.

A flexible substantially impervious guard 83 of live rubber encircles the open upper end of the hopper 76 and bears upon the end wall 28 of the housing 10 to seal against passage of air between the housing 10 and the hopper 76.

An endless chain 84 is operably associated with the several sprockets 80, and as the hand crank 86 is rotated to rotate one sprocket 80, the chain is driven to rotate the other sprockets 80 and therefore the hopper 76 is adjusted according to manual selection.

The harvested grain, including the heads and straw, is admitted into the threshing device or grain separator by lowering it into the hopper 76. As it progresses downwardly from the bottom of the hopper 76, the agitator blades 62 successively tear or remove portions of the harvested material where the centrifugal force of the rapidly rotating drum 56 causes it to move to the outer wall 58. Since the wall 58 diverges from the vertical substantially 13 degrees, the centrifugal force from the rapid rotation causes the harvested grain, straw, and chaff to move upwardly along the inner face of the reticulate drum wall 58. The grain is separated and removed from the heads as the harvested material rubs over the outer face 76' of the hopper 76 and escapes through the passages 59 to the area surrounding the drum 56. The face 76 is provided with a plurality of vertically disposed ribs 77, which facilitates separation of the grain from the straw. The straw passes upwardly out of the upper end of the drum 56 and is discharged through the aperture 24 by means of the centrifugal fan action of the blades 74. The chaff which may escape through the grain passages 59 of the drum 56 is also carried upwardly by the currents of air, and is discharged through the aperture 24. The heavier particles of grain drop onto the grain pan 32 and fall onto the rotating disc 50, where centrifugal force carries them to the cylindrical wall of the housing 10, and the fan action of the blades 54 causes the grain to discharge from the aperture 22.

It will thus be seen that I have provided a very effective grain separator which operates on the principles of centrifugal force and is not dependent upon gravity and therefore is not adversely affected by continuous tilting movements of the machine which are prevalent during most harvesting operations.

Having thus described my invention, I claim as new and desire to secure by Letters Patent of the United States the following:

1. A grain separator comprising a substantially cylindrical housing having radial discharge apertures spaced from opposed ends thereof; impellers within said housing and rotatable about the axis thereof and coincident to the horizontal planes of said apertures; a truncated-cone-shape drum having a circumferentially continuous upwardly divergent reticulate wall having plural grain passages therethrough and closed at its lower end; said drum being supported for rotation about a vertical axis with its upper edge coincident to the upper one of said impellers; means for rotating said drum; and an open-ended truncated-cone-shape hopper coincident in shape to said drum and supported on said housing coaxially within said drum for selective vertical positioning with respect to said drum, whereby the space between the walls of said drum and said hopper is selectively variable.

2. A grain separator comprising a substantially cylindrical housing having radial discharge apertures spaced from opposed ends thereof; impellers within said housing and rotatable about the axis thereof and coincident to the horizontal planes of said apertures; a truncated-cone-shape drum having a circumferentially continuous upwardly divergent reticulate wall having plural grain passages therethrough and closed at its lower end; said drum being supported for rotation about a vertical axis with its upper edge coincident to the plane of the upper one of said impellers; means for rotating said drum; an open-ended truncated-cone-shape hopper coincident in shape to said drum and supported on said housing coaxially within said drum for selective vertical positioning with respect to said drum, whereby the space between the walls of said drum and said hopper is selectively variable; and a flexible substantially impervious guard sealingly disposed between the upper ends of said hopper and said housing.

3. A grain separator comprising a truncated-cone-shape drum having a circumferentially continuous upwardly diverging reticulate wall having plural grain passages therethrough and closed at its lower end; said drum being supported for rotation about a vertical axis; means for rotating said drum; an open-ended truncated-cone-shaped hopper coincident in shape to said drum and disposed coaxially within said drum; means supporting said hopper for selective vertical positioning with respect to said drum, whereby the space between the walls of said drum and said hopper is selectively variable; a concentric cylindrical housing encircling said drum and hopper; impellers in said housing rotatable about the axis thereof; said housing having radial discharge apertures coincident to said impellers; and manually adjustable air ingress openings at the bottom of said housing, to control the amount of air flow created by said impellers within said housing.

4. A grain separator comprising a substantially cylindrical housing having a radial discharge aperture spaced from the upper end thereof; an impeller in said housing rotatable about the axis thereof and radially coincident to said aperture; a truncated-cone-shape drum having a circumferentially continuous upwardly divergent reticulate wall having plural grain passages therethrough and closed at its lower end supported in said housing for rotation about its vertical axis; an open-ended truncated-cone-shape hopper coincident in shape to said drum and disposed coaxially within said drum; said housing supporting a plurality of upstanding externally threaded rods; each of said rods having a chain sprocket threadedly engaged thereon; an endless chain operatively associated with said sprockets; and manual means for rotating one said sprocket to drive said chain whereby all said sprockets are rotated simultaneously; means carried by said hopper and pivotally associated with said sprockets for vertically adjusting said hopper by rotation of said sprockets, whereby the space between the walls of said drum and said hopper is selectively variable; and means for rotating said drum.

References Cited in the file of this patent

UNITED STATES PATENTS

| | | |
|---|---|---|
| 2,058,739 | Stoner | Oct. 27, 1936 |
| 2,069,735 | Metcalf | Feb. 2, 1937 |
| 2,072,598 | Kile | Mar. 2, 1937 |
| 2,311,379 | Gillanders | Feb. 16, 1943 |